United States Patent
Sakezles

(10) Patent No.: US 7,507,092 B2
(45) Date of Patent: Mar. 24, 2009

(54) CELL SEEDED MODELS FOR MEDICAL TESTING

(76) Inventor: Christopher Sakezles, 500 Trinity La., Apt. 7202, St. Petersberg, FL (US) 33716

( * ) Notice: Subject to any disclaimer, the term of this patent is extended or adjusted under 35 U.S.C. 154(b) by 362 days.

(21) Appl. No.: 11/172,575

(22) Filed: Jun. 30, 2005

(65) Prior Publication Data
US 2007/0003916 A1 Jan. 4, 2007

(51) Int. Cl.
G09B 23/28 (2006.01)

(52) U.S. Cl. .................................... 434/267

(58) Field of Classification Search ............... 424/262, 424/267, 268, 270, 271, 272, 273, 274
See application file for complete search history.

(56) References Cited

U.S. PATENT DOCUMENTS

| | | | | |
|---|---|---|---|---|
| 5,908,302 A * | 6/1999 | Goldfarb | ............ | 434/262 |
| 5,947,744 A * | 9/1999 | Izzat | ............ | 434/272 |
| 6,062,866 A * | 5/2000 | Prom | ............ | 434/268 |
| 6,132,463 A * | 10/2000 | Lee et al. | ............ | 600/36 |
| 6,474,993 B1 * | 11/2002 | Grund et al. | ............ | 434/262 |
| 6,488,507 B1 * | 12/2002 | Stoloff et al. | ............ | 434/272 |
| 6,511,325 B1 * | 1/2003 | Lalka et al. | ............ | 434/272 |
| 6,589,057 B1 * | 7/2003 | Keenan et al. | ............ | 434/271 |
| 6,773,263 B2 * | 8/2004 | Nicholls et al. | ............ | 434/267 |
| 6,780,016 B1 | 8/2004 | Toly | | |
| 6,887,082 B2 * | 5/2005 | Shun | ............ | 434/267 |
| 6,939,138 B2 * | 9/2005 | Chosack et al. | ............ | 434/262 |
| 7,008,232 B2 * | 3/2006 | Brassel | ............ | 434/268 |
| 2003/0044395 A1 * | 3/2003 | Morgan et al. | ............ | 424/93.21 |
| 2004/0009459 A1 * | 1/2004 | Anderson et al. | ............ | 434/262 |
| 2004/0118224 A1 | 6/2004 | Tate et al. | | |
| 2004/0234933 A1 | 11/2004 | Dawson et al. | | |
| 2007/0148626 A1 * | 6/2007 | Ikeda | ............ | 434/272 |

OTHER PUBLICATIONS

The Effects of Testing Environment on the Viscoelastic Properties of Soft Tissues, Mark P. Ottensmeyer et al., ISMS 2004.
"Measuring In Vivo Animal Soft Tissue Properties for Haptic Modeling in Surgical Simulation," Iman Brouwer et al., Medicine Meets Virtual Reality 2001, J. D. Westwood et al.
How to Meet the New Simulation Testing Requirements, Medical Device & Diagnostic Industry Magazine, MDDI Article Index, Mar. 1998.

* cited by examiner

Primary Examiner—Kurt Fernstrom
(74) Attorney, Agent, or Firm—Timothy H. Van Dyke; Beusse Wolter Sanks Mora & Maire

(57) ABSTRACT

Disclosed herein are synthetic anatomical models, methods of making and using same, that are designed to enable simulated use testing by medical device, pharmaceutial, and consumer product developers. These models are unique in possessing a level of complexity that allows them to be substituted for either a live animal, an animal cadaver, or a human cadaver in the testing of such products. These models are further characterized by a similarity of geometry, individual component physical properties, and component-to-component interfacial properties with the appropriate target tissue and anatomy. Specifically exemplified herein are models comprising living cells disposed in or on at least a portion thereof.

4 Claims, 5 Drawing Sheets

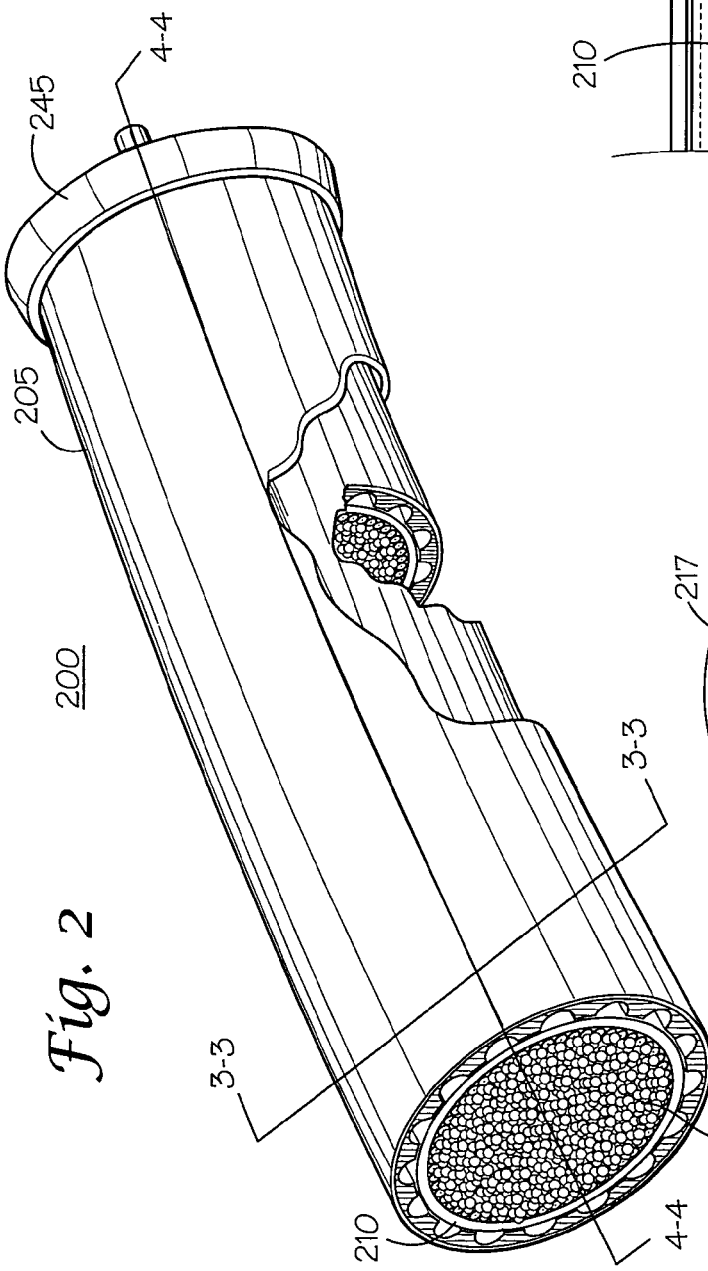
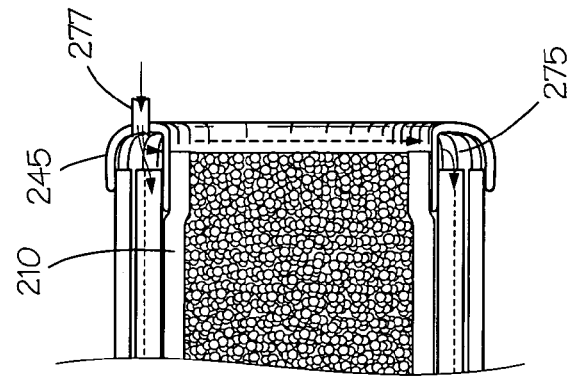
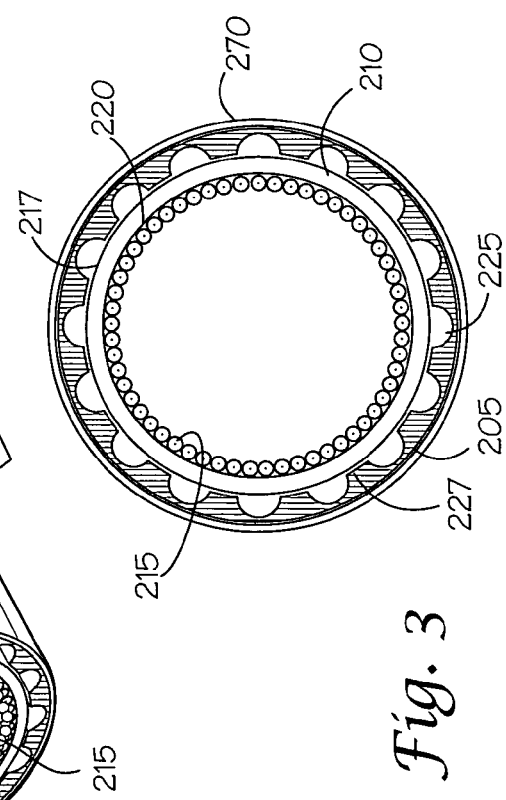

b.

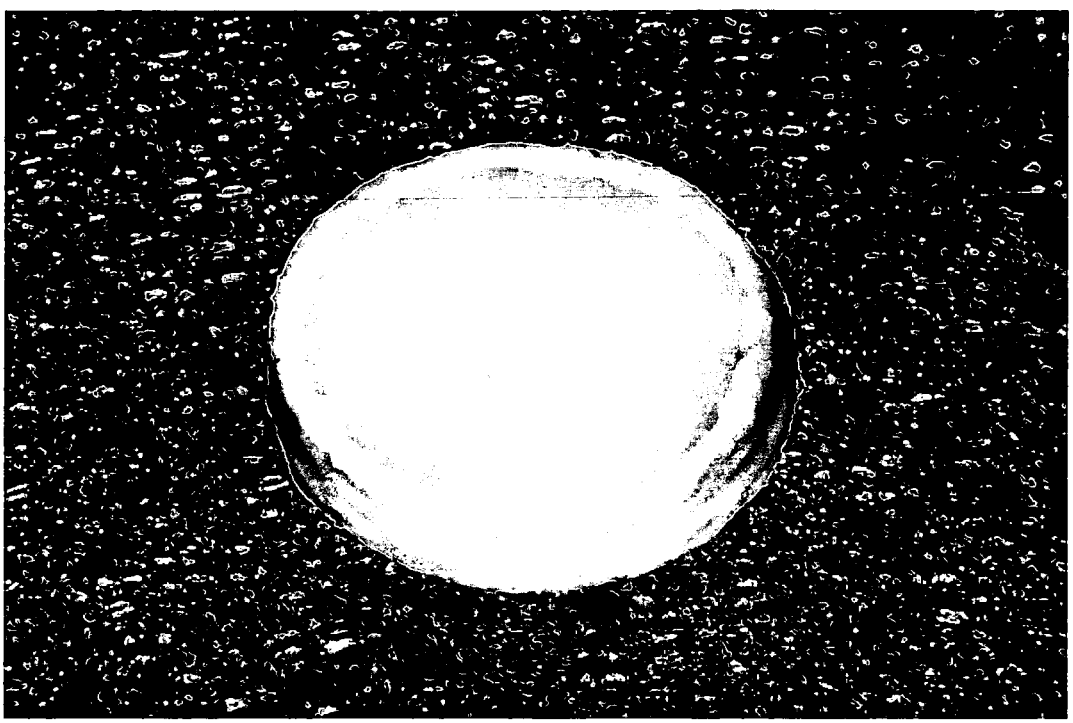
a.
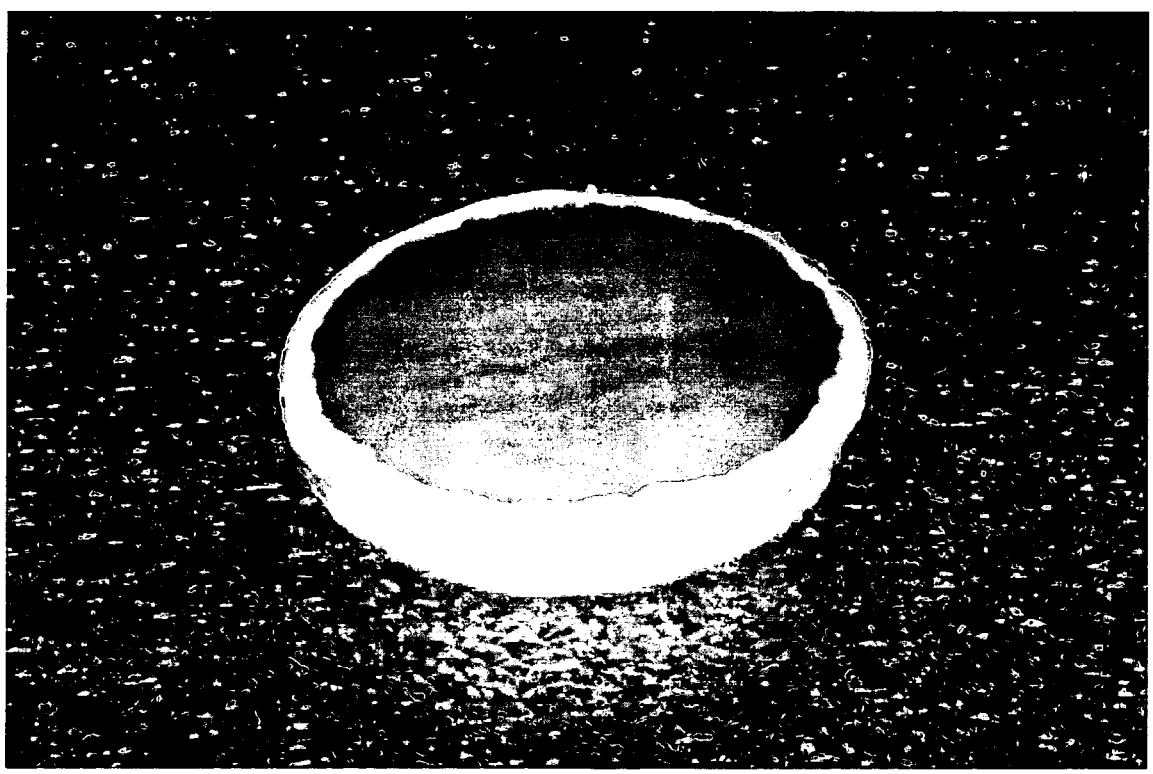
b.
Fig. 8

CELL SEEDED MODELS FOR MEDICAL TESTING

BACKGROUND

During the development of any new medical device, various tests may be required, including the characterization of physical properties (geometric, mechanical, electrical, electromagnetic, thermal, chemical, etc), the evaluation of overall device performance (numerical simulation or simulated use testing), or testing to determine the effect of the device on living tissues. These development tests may be broadly classified as either biological tests, theoretical tests, or physical tests, although there are areas where these testing classes overlap one another.

Biological testing generally involves an analysis of the interaction between the device and human or animal tissues. The biological tests that are performed first are generally biocompatibility tests, which evaluate the tendency of the device to cause damage to living tissues by mere presence of the materials comprising the device. Later on in the development cycle, the device may be tested in a live animal (animal study) or a human patient (clinical trial) to determine the ability of the device to perform its intended use and to evaluate safety and efficacy (device performance). Animal studies represent a special type of test known as simulated use testing, so called because the animal is a simulation of the actual use (human) environment.

Theoretical or computational tests may include finite element analysis, kinematic analysis, and computational fluid dynamics. These tests employ knowledge of the physical characteristics (dimensions, strength, mass, etc) of the device and actual use environment (viscosity, density, temperature, etc) to construct a computer model of the device-tissue system. This type of model may then be used to predict device performance, the tendency of the device to fail, and possibly the tendency of the device to cause injury. Of course, these models are limited by the assumptions made in their derivation and the computational power of the computer. Unfortunately, it may be difficult to quantitatively describe a device, and more importantly the actual use environment, in sufficient detail to yield realistic results.

Physical testing essentially evaluates the design of the device. That is, this physical testing may involve; (1) the measurement of device geometry such as lengths, diameters, and wall thicknesses, (2) the measurement of mechanical properties such as tensile strength and stiffness, (3) the measurement of other device characteristics such as color, thermal conductivity, dielectric properties or other properties, or (4) simulation testing involving trial use of the device in some model of the actual use environment. The purpose of this simulation testing is to evaluate the safety (tendency to injure) and efficacy (performance characteristics) of the device, and in general to evaluate the ability of the device to perform it's intended use. As previously stated, animal studies are one important form of simulation test. Other vehicles (the simulated environment) for this type of testing include cadavers (both human and animal) and benchtop fixtures, which are man-made representations of a particular target anatomy.

The new FDA quality system regulation (QSR) now requires testing under simulated or actual use conditions for all nonexempt Class II and Class III medical devices. Not all manufacturers perform actual use (human clinical trial) testing for every medical device, so in these cases simulation testing is definitely a requirement. At least four traditional simulation options are available to meet this requirement, each with its own advantages and drawbacks. These four general approaches (Table I) to simulation testing involve theoretical (computer) models, benchtop (physical) models, cadaver (human or animal) models, and live animal models. Once again, human subjects are also employed in the development of many medical devices, but since humans represent the actual use environment, these tests (clinical studies) are not considered simulation tests.

TABLE I

The four general approaches to simulation testing including the environment and models involved.

| Theoretical Model | Benchtop Model | Cadaver Model | Live Animal |
|---|---|---|---|
| In vitro Theoretical or computational model | In vitro Physical properties model | In vitro Human or animal cadaver | In vivo Animal study |

Typical medical device development schemes generally involve testing early prototypes in simple bench top test fixtures, and feedback from these early tests lead to design revisions that are subsequently evaluated in the same model. However, since this process is iterative, as the design matures the models that are needed generally become more complex. For example, a new coronary catheter may undergo initial testing in simple plastic tubes, followed by glass models designed to mimic the size and geometry of the coronary vasculature. The product may experience a series of changes resulting from these tests until the designer is satisfied with performance, and once a certain level of confidence is achieved the testing will proceed to the next available model. In the medical device industry this model is ultimately a live animal.

In practice, the medical device industry typically employs one or more of the four previously mentioned (Table I) model types in simulation testing prior to seeking approval for human use (a clinical trial). Of course, common sense dictates that the model selected be representative of actual use conditions, but only the clinical trial, which is not a simulation test, fully satisfies this criteria. Unfortunately, human subjects are unavailable for use until late in the development cycle due to risk, regulatory, and ethical considerations. A live animal model has therefore seen as the next best choice.

Animal models are currently the gold standard of preclinical trial medical device simulated use testing. In fact, the quality of data produced in these studies can be very high, particularly if the proper animal model is selected, the device and protocol are well designed, and a large number of animals are used. Designed experiments are possible and are commonly employed in such test, but require an increase in the number of animals. These tests are also performed under physiological (for the animal) conditions. Unfortunately, these studies are expensive because of the staff and facilities required to support the work. A registered facility must be contracted to run the study and care for any animals purchased, a surgeon must be retained to perform the required procedures and to generate the study protocol, and the services of a veterinarian, anesthesiologist, and surgical aide are also required. These studies can easily exceed $100,000 in total costs, and grow even more costly as the scope of the study is increased.

The inability to test prototype devices on human subjects is the reason medical device developers resort to animal studies in the first place. Still, animal models suffer from a whole range of unique problems, including the many deviations between human and animal anatomy and physiology, the confounding effects of variation between individual animals, and the unpredictability that arises from using a model that is extraordinarily complex.

Animal models vary widely, but may include live pig, sheep, dog, and cat specimens, among others. While these animals do offer an in vivo environment, their anatomy and physiology differs significantly from that of a human, and the great expense and required facilities limit the possibility of in-house use. Reproducibility may also be an issue as both inter-and intrasubject variability are impossible to control. Additional considerations include contention with the Animal Welfare Act, the significant expense associated with contracting regulated facilities and medical practitioners, and the risks related to handling biohazardous materials.

To get around these issues, developers tend to gravitate toward simpler and more accessible models such as cadavers and benchtop fixtures. Unfortunately, there tends to be an inverse relationship between the usefulness and complexity of the model employed. For example, cadaver tissues provide an accurate representation of anatomical geometry, but the required tissue preservation greatly alters the characteristics of the tissues. In addition, biological temperatures and flows cannot generally be simulated, subjects are difficult to source and maintain in useful quantities, and an educational institution must almost always be contracted (at considerable expense) to perform the study.

These factors drive early stage medical device developers to simple benchtop fixtures made (usually) in house by the developer. Unfortunately, these models are typically designed by individuals lacking an understanding of anatomy and physiology, and are usually fabricated from typical engineering materials such as metal, glass, and plastic. While an argument may be made that these models are better than nothing, they are certainly not representative of actual use conditions.

U.S. patent application Ser. Nos. 11/098,248 and 11/050,161 disclose a new type of materials and models for medical testing. These applications are incorporated herein in their entirety by this reference. Building on these advancements, integrating living cells into medical testing models provides additional benefits related to validating the impact of certain medical devices on tissues, and for validation studies.

SUMMARY

According to one aspect, the subject invention pertains to model embodiments that comprise living cells, wherein the models may serve as highly sophisticated bench top models that are designed to be used by medical device, pharmaceutical, and consumer product developers both early and late in the development process. These models mimic not only the geometry of the target anatomy, but also the physical characteristics of the living tissues that comprise this anatomy.

According to another aspect, the invention pertains to a method of testing a medical device, pharmaceutical, or consumer product on a subject, wherein the use of said device or product impacts on a tissue in said subject. The method may include the following steps: producing a model comprising two or more contiguous layers, said two or more layers comprising at least one layer comprising living cells; contacting said at least one layer comprising living cells with said device or product; and evaluating affect of said contacting step on said at least one layer comprising living cells.

In a further aspect, the invention pertains to a model designed for testing a medical device, pharmaceutical, or consumer product, said model may include an artificial anatomic structure configured to geometrically mimic a human or animal anatomic structure; analog material employed by said artificial anatomic structure designed to simulate at least one predetermined physical characteristic of a target tissue, and at least one portion comprising living cells disposed therein or thereon, or both.

These and other advantageous aspects of the invention are described herein.

BRIEF DESCRIPTION OF THE DRAWINGS

FIG. 2 shows a perspective view of an luminal structure embodiment comprising a lumen lined with living cells and comprising nourishment delivery channels FIG. 3 shows a cross-sectional view of the 3-3 plane of the embodiment shown in FIG. 2.

FIG. 4 shows a cross-section view of the 4-4 plane of the embodiment shown in FIG. 2.

FIG. 8 shows a photograph of a femoral puck embodiment, top perspective view (a) and bottom perspective view (b).

DEFINITIONS

Figure 1:
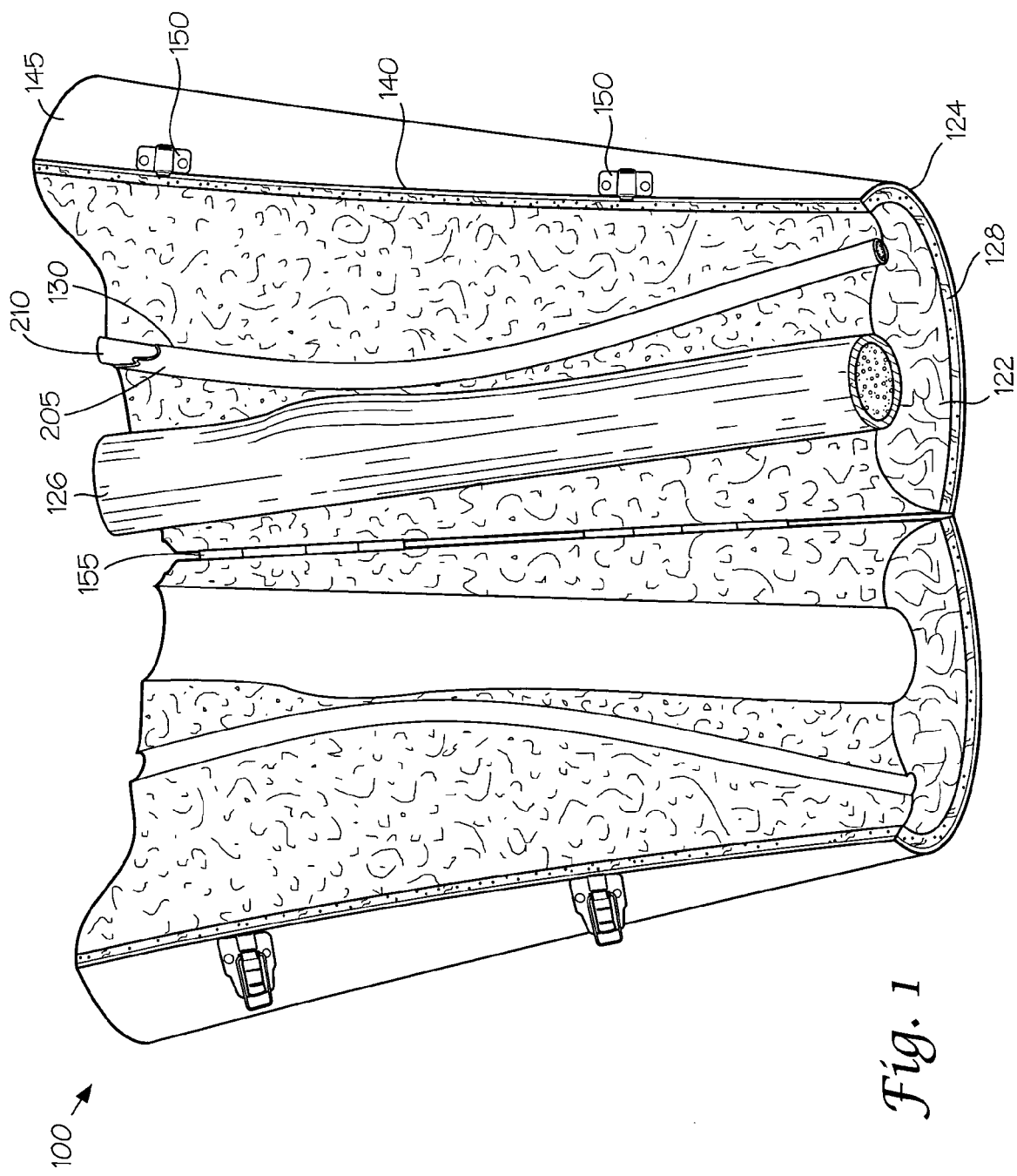
FIG. 1 shows a perspective view of a femoral artery model embodiment comprising an artery lined with living cells and nourishment delivery channels

It is important to an understanding of the present invention to note that all technical and scientific terms used herein, unless defined herein, are intended to have the same meaning as commonly understood by one of ordinary skill in the art. The techniques employed herein are also those that are known to one of ordinary skill in the art, unless stated otherwise. For purposes of more clearly facilitating an understanding the invention as disclosed and claimed herein, the following definitions are provided.

The term "tissue analog material(s)" as used herein refers to a material or combination of materials designed to simulate one or more physical characteristics (properties) of a relevant living target tissue. Analog materials used to design tissue analog materials may include, but are not limited to, hydrogel, interpenetrating polymer networks, fibers, silicone rubber, natural rubber, other thermosetting elastomers, other thermoplastic elastomers, acrylic polymers, other plastics, ceramics, cements, wood, styrofoam, metals, actual human tissues, actual animal tissues, collagen, gelatin and any combination thereof. For model embodiments comprising one or more components, each component part may be constructed from one or more tissue analog materials.

The tissue analog materials are formulated to simulate one or more physical characteristics of a target living tissue. These physical characteristics include, but are not limited to, uni-axial or multi-axial tensile strength or modulus, uni-axial or multi-axial compressive strength or modulus, shear strength or modulus, coefficient of static or dynamic friction, surface tension, elasticity, wettability, water content, electrical resistance and conductivity, dielectric properties, optical absorption or transmission, thermal conductivity, porosity, moisture vapor transmission rate, chemical absorption or adsorption, the presence of ionic components such as sodium and potassium salts, or combinations thereof. Each tissue analog material is designed so that one or more physical characteristics of the tissue analog material will sufficiently match the corresponding physical characteristic(s) of the relevant tissue on which the tissue analog material is based. More specifically, each tissue analog material is preferably formulated so that the physical characteristic(s) of the tissue analog fall within a range that is no more than 50% lesser or greater than the targeted physical characteristic(s) of the relevant living tissue on which the tissue analog material is based.

The aforementioned listed physical characteristics are well understood, and may be determined by well-established techniques. References teaching the determination of different physical characteristics (in no way intended to be an exhaustive list) include the following:

(1) Shigley, J. E., and Mischke, C. R. *Mechanical Engineering Design*, $5^{th}$ Ed., McGraw-Hill, 1989.

(2) Harper, C. A., *Handbook of Materials for Product Design*, $3^{rd}$ Ed., McGraw-Hill, 2001.

(3) Askeland, D. R., *The Science and Engineering of Materials*, $2^{nd}$ Ed., PWS-Kent, 1989.

(4) LaPorte, R. J., *Hydrophilic Polymer Coatings for Medical Devices*, Technomic Publishing, 1997

(5) Hayt, W. H., and Kemmerly, J. E., *Engineering Circuit Analysis*, $4^{th}$ Ed., McGraw-Hill, 1986.

(6) Park, J. B., and Lakes, R. S., *Biomaterials, An Introduction*, $2^{nd}$ Ed., Plenum Press, 1992.

(7) Lindenburg, M. R., Editor, *Engineer in Training Manual*, $8^{th}$ Ed., Professional Publications, 1992.

Other references of note that are incorporated herein are Ottensmeyer et al., "The Effects of Testing Environment on the Viscoelastic Properties of Soft Tissues, Proceedings of Medical Simulation", *International Symposium*-ISMS 2004, Cambridge, Mass., Jun. 17-18, 2004 and references cited therein; and Brouwer et al. "Measuring in Vivo Anaimal Soft Tissue Properties for Haptic Modeling in Surgical Simulation", *Proc. Medicine Meets Virtual Reality*, Newport Beach, Cailf., IOS Press, 2001, and references cited therein.

Particular teachings of certain physical characteristics are noted (references numbers related to preceding list):

Tensile strength and modulus, both measured in Pascal (Pa)-Ref 1, pg 186.

Compressive strength and modulus, both measured in Pascal (Pa)-Ref 2, pg 718.

Shear strength and modulus, both measured in Pascal (Pa)-ASTM Standard D3165-00, Standard Test Method for Strength Properties of Adhesives in Shear by Tension Loading of Single-Lap-Joint Laminated Assemblies.

Coefficient of static and dynamic friction, a dimensionless number-Ref 7, pg 445.

Surface tension, measured in dynes/cm-Ref 6, pg 57.

Wettability, measured in terms of contact angle (degrees)-Ref 4, pg 3.

Water content, measured in mass percent (%)-Ref 4, pg 41.

Electrical resistance and conductance, measure in ohm for resistance and mho for conductance-Ref 5, pg 25.

Dielectric properties, measured in various units—ASTM Standard E2039-04 Standard Test Method for Determining and Reporting Dynamic Dielectric Properties.

Optical absorption and transmission, measured in $cm^{-1}$-Ref 3, pg 739.

Thermal conductivity, measured in cal/(cm-s-C)—ASTM Standard D5930-01 Standard Test Method for Thermal Conductivity of Plastics by Means of a Transient Line-Source Technique.

Porosity, measured in volume percent (%)-Ref 3, pg 490.

Moisture vapor transmission rate, measured in $g/(mil-in^2)$-Ref 2, pg 941.

The term "hydrogel(s)" as used herein refers to a unique class of materials that contain a large amount of water and generally exhibit a high degree of elasticity and lubricity. Hydrogels are materials that are wettable and swell in the presence of moisture and retain water without dissolving. These materials are generally constructed of one or more hydrophilic polymer molecules, although copolymerization with hydrophobic monomers may also lead to the formation of a hydrogel. These materials are generally elastic, and exhibit a three-dimensional network that is either crosslinked directly by chemical bonds or indirectly through cohesive forces such as molecular entanglements, ionic bonds, or hydrogen bonding. These materials are well-suited for simulating the physical characteristic(s) of many living soft tissues.

Accordingly, the term "geometrically mimic" as used herein refers to configurations of models that comprise a similar geometric feature of the target anatomical structure to be mimicked, such as length, width, diameter, thickness, cross-section, and/or, in most cases general shape of a particular target anatomy.

The term "analog material" as used herein refers to a material or combination of materials designed to mimic one or more physical properties of a relevant target tissue. Analog materials may include, but are not limited to, hydrogel, silicone rubber, natural rubber, other thermosetting elastomers, other thermoplastic elastomers, acrylic polymers, other plastics, ceramics, cements, wood, styrofoam, metals, actual human tissues, actual animal tissues, and any combination thereof. Each component part in model embodiments may be constructed from one or more analog materials.

The term "luminal structure" refers to any structure relating to a structure in a human or nonhuman animal body through which a substance flows through, including, but not limited to, the arterial and venous vasculature anywhere in the anatomy, the trachea, the sinuses, the oral cavity, the esophagus, the urinary tract, the ear canal, certain portions of the male and female reproductive system, the bile ducts, other portions of the digestive system, and any other part of the anatomy that resembles a luminal structure or cavity. Depending on the context in which the term luminal structure is used herein, it may refer to a representative anatomical structure in a living or deceased animal (i.e., native structure), or may refer to an artificial luminal structure intended to model such native structure. As described herein, artificial luminal structure may actually pertain to a luminal structure removed from a living or deceased animal but which is used as a model.

The term "cell seeded portion" refers to a portion of a model embodiment that comprises living cells disposed within or on a substrate, or both. Typically, the cell seeded portion is a layer which is intended for direct contact by a medical device, pharmaceutical, or consumer product during the testing of such device or product.

The term "substrate" refers to a structural support upon and/or into which living cells may be disposed. A substrate may comprise a layer or portion of an embodiment comprised of an analog material. Substrates may have little or no porosity which would typically provide a surface upon which cells are disposed or have increased porosity thereby allowing cells to integrate into the substrate.

DETAILED DESCRIPTION

The subject invention pertains to complex synthetic anatomical models that are designed to enable simulated use testing by medical device, pharmaceutical, and consumer product developers. These models are unique in possessing a level of complexity that allows them to be substituted for either a live animal, an animal cadaver, or a human cadaver in the testing of such devices and products. These models are further characterized by a similarity of geometry, individual component physical characteristics, and component-to-component interfacial properties with a particular target tissue and anatomy. Specifically exemplified herein are models that integrate living cells to enhance simulation of target tissue properties and to enable direct contact studies involving medical devices, pharmaceuticals, and consumer products.

Model embodiments of the subject invention may be nearly as simple to use as a bench top fixture, but provide feedback that is superior in many respects to cadaver tests, animal studies, and even human clinical trials. In fact, a product may be tested not just in terms of performance, but also in terms of effect on the target anatomy. This is possible because the portion of the model contacting the device or product is removable, allowing a quasi-histological examination of the target anatomy after each use. In addition, because the models are artificial and mass produced, multiple tests may be performed either under identical conditions or by altering only the test parameters (temperature, flow, contact angle, etc) desired. This capability helps to eliminate the statistically confounding effect of model variation that plagues cadaver, animal, and human subject studies, and also enables the use of designed experiments to explore device-tissue interactions and interactions between various design parameters.

The subject invention produces models possessing several advantages over typical bench top fixtures. Some fixtures in use today may be designed to mimic the overall size and geometry of a particular target tissue, and the best of these are also designed to work at body temperature in the presence of fluids. However, the use of engineering materials in the construction of these models make them dissimilar to live human or animal anatomy in a profound way. This calls into question the value of any data collected, even when designed experiments are employed. In addition, such models may only be used to predict device performance, not the effect of the device on the target tissue.

In contrast, the methods of the subject invention produce models that enable a potentially large number of tests to be completed in an environment that is both geometrically and mechanically similar to the target anatomy. These tests may be performed by an engineering technician on a lab bench, but the tests still produce very high quality data. Also, because this data may be generated early in the development cycle, design errors are discovered sooner, leading to a shorter cycle and a reduced development budget. Further, unlike traditional bench top testing, models produced by the subject methods allow the user to predict how a device or product will actually function in contact with the human body, and since the effect of the device on the target tissue can be predicted by way of the quasi-histological examination, the risk to the patient may be predicted early in the design process before animal studies and human clinical trials are typically performed.

According to certain model embodiments of the subject invention, the models are constructed from multiple components, and these individual components are fabricated in such a way that they mimic the geometry (length, width, diameter, thickness, cross-section, shape, etc) of a particular portion of the target anatomy that is relevant to the medical device, pharmaceutical, or consumer product under test.

Cells and Cell Culture

A cell seeded layer for certain model embodiments may be seeded with any of a variety of cells. Individual cells on the seeded surface may be either separate from one another (sparsely populated surface) or may form a contiguous surface of living tissue (densely populated surface). A "cell", according to the present invention, is any preparation of living tissue, including primary tissue explants and preparations thereof, isolated cells, cells lines (including transformed cells), and host cells. Any preparation of living cells may be use to seed the substrate for cell seeded layer. For example, cultured cells or isolated individual cells may be used. Alternatively or additionally, pieces of tissue, including tissue that has some internal structure, may be used. The cells may be primary tissue explants and preparations thereof, cell lines (including transformed cells), or host cells.

Examples of cells that can be seeded or cultured on the substrate include, but are not limited to, epidermal cells, ciliated epitherlial cells, bone marrow cells, smooth muscle cells, stromal cells, stem cells, mesenchymal stem cells, endothelial precursor cells, synovial derived stem cells, embryonic stem cells, blood vessel cells, chondrocytes, osteoblasts, precursor cells derived from adipose tissue, bone marrow derived progenitor cells, kidney cells, intestinal cells, islets, beta cells, Sertoli cells, peripheral blood progenitor cells, fibroblasts, glomus cells, keratinocytes, nucleus pulposus cells, annulus fibrosus cells, fibrochondrocytes, stem cells isolated from adult tissue, oval cells, neuronal stem cells, glial cells, macrophages and genetically transformed cells or combination of the above cells.

Any available methods may be employed to harvest, maintain, expand, and prepare cells for use in the present invention. Useful references that describe such procedures include, for example, Freshney, Culture of Animal Cells: a Manual of Basic Technique, Alan R. Liss Inc., New York, N.Y., incorporated herein by reference.

Methods of isolating and culturing such tissue-producing or-degrading cells, and/or their precursors, are known in the art (see, for example, Vacanti et al., U.S. Pat. No. 5,041,138; Elgendy et al., Biomater. 14:263, 1993; Laurencin et al., J. Biomed. Res. 27:963, 1993; Freed et al., J. Cell. Biochem. 51:257, 1993; Atala et al., J. Urol. 150:745, 1993; Ishaug et al., J. Biomed. Mater. Res. 28:1445, 1994; Chu et al., J. Biomed. Mater. Res. 29:1147, 1995; Thomson et al., J. Biomater. Sci. Polymer Edn. 7:23, 1995, each of which is incorporated by reference).

For example, mesenchymal stem cells, which can differentiate into a variety of mesenchymal or connective tissues (including, for example, adipose, osseous, cartilagenous, elastic, and fibrous connective tissues), can be isolated, purified, and replicated according to known techniques (see Caplan et al., U.S. Pat. No. 5,486,359; Caplan et al., U.S. Pat. No. 5,226,914; Dennis et al., Cell Transplantation 1:23, 1992, each of which is incorporated herein by reference). Such mesenchymal cells have been studied in association with tricalcium phosphate and hydroxyapatite carriers and have been found to be capable of successful differentiation from within such carriers (see Caplan et al., U.S. Pat. No. 5,197, 985, incorporated herein by reference). Similar procedures are employed to direct mesenchymal cell differentiation on or within the substrate material.

In some embodiments, attachment of the cells to the substrate is enhanced by coating the substrate with compounds such as basement membrane components, agar, agarose, gelatin, gum arabic, collagens types I, II, III, IV, and V, fibronectin, laminin, glycosaminoglycans, mixtures thereof, and other hydrophilic and peptide attachment materials known to those skilled in the art of cell culture.

In some embodiments it may be desirable to add bioactive molecules to the cells. These are referred to generically herein as "factors" or "bioactive factors". Examples of growth factors include heparin binding growth factor (hbgf), transforming growth factor alpha or beta (TGF-β), alpha fibroblastic growth factor (FGF), epidermal growth factor (TGF), vascular endothelium growth factor (VEGF), some of which are also angiogenic factors. Other factors include hormones such as insulin, glucagon, and estrogen. In some embodiments it may be desirable to incorporate factors such as nerve growth factor (NGF) or muscle morphogenic factor (MMP).

Suitable growth conditions and media for cells in culture are well known in the art. Cell culture media typically comprise essential nutrients, but also optionally include additional elements (e.g., growth factors, salts and minerals) which may be customized for the growth and differentiation of particular cell types. For example, "standard cell growth media" include Dulbecco's Modified Eagles Medium, low glucose (DMEM), with 110 mg/L pyruvate and glutamine, supplemented with 10-20% Fetal Bovine Serum (FBS) or 10-20% calf serum (CS) and 100 U/ml penicillin. Other standard media include Basal Medium Eagle, Minimal Essential Media, McCoy's 5A Medium, and the like, preferably supplemented as above (commercially available from, e.g., JRH Biosciences, Lenexa, Kans.; GIBCO, BRL, Grand Island, N.Y.; Sigma Chemical Co., St. Louis, Mo.). By way of illustration, endothelial precursor cells (EPC) are one of the cell types that may be used to form an impact bearing surface of a vasculature model. EPCs can be expanded in vitro by any of the methods known in the art. For example, to expand EPCs in vitro, a leukocyte fraction containing EPCs is plated onto fibronectin-coated plates. See U.S. Patent Application 2004/0044403. It is desirable to perform a serial transfer of the cell suspension to new fibronectin-coated plates to remove rapidly adherent hematopoietic cells. After approximately 21 to 28 days in culture, the number of outgrowth colonies typically ranges between 2 to 3 per $1\times10^7$ total input cells. If allowed to continue growing, the outgrowth cells expands exponentially and reached $1.6.times.10^9$ cells by 3 weeks. Additionally, EPC progenitors can be mobilized in vivo by administration of recruitment growth factors, e.g., GM-CSF and IL-3, prior to removing the progenitor cells from the patient.

Construction of Models

According to one embodiment, the subject invention pertains to a method for producing a model designed for testing a medical device wherein the method includes (a) providing a substrate shaped to geometrically mimic a human or nonhuman animal anatomical structure; (b) contacting said substrate with cells capable of adhering thereto, thereby forming a cell-seeded portion of said model; and (c) maintaining said cell seeded portion for a growth period in a fluid media suitable for growth of said cells.

Part of the design process involves prioritizing the various target characteristics for the synthetic analog materials. Less important characteristics should be placed further down the list and given a lower priority during the analog material design process. This is typically, though not necessarily, required because the design becomes progressively more difficult to produce as the number of modeled characteristics increases. The number of target characteristics for a particular analog material are preferably limited to three or fewer. If more complex model behavior is required than this restriction will allow, then the number of components can be increased instead. For example, the artery might by constructed from three two-property analog materials instead of one three-property analog. Typically, a component comprised of several analogs will exhibit a more complex (and realistic) response than a component constructed from a single (multi-property) analog. In the case of the femoral artery model, the artery component itself is preferably composed of two or three different analog materials. The model may also employ multi-part components for skin, fat, muscle, and bone.

The choice of materials used in a constructing the model will to a large extent determine how realistically the model simulates the in vivo environment. For example, many medical device companies presently use glass tubing to mimic portions of the cardiovascular system; however, glass is obviously more rigid than most biological tissues and tends to be much smoother than the luminal structural surface of diseased, or even healthy, blood vessels. Consequently, a catheter will behave much differently in a glass model than in an actual blood vessel.

The composition of individual analog materials is unimportant as long as the relevant characteristics are accurately modeled. Typical engineering materials, including many metals, ceramics, and plastics commonly employed in industry may be used depending on the required analog characteristics. However, in cases where soft tissues are being modeled it will generally be advantageous to use nonstandard materials such as hydrogels. These materials swell in the presence of moisture and can retain large amounts of water without dissolving. They are constructed of one or more hydrophilic polymer molecules, although copolymerization with hydrophobic monomers may also lead to the formation of a hydrogel. These materials are generally elastic, and exhibit a three-dimensional network that is either crosslinked directly by chemical bonds or indirectly through cohesive forces such as ionic or hydrogen bonding. Hydrogels are particularly advantageous in this application because the formula may be manipulated to give a combination of water content, lubricity, abrasion resistance, and other properties characteristic of living soft tissues. In this respect these materials are particularly suited to modeling fragile tissues such as venous or arterial intima and ciliated epithelia. Hydrogels also provide an ideal substrate for maintaining a surface of live cells if so desired.

The methods of producing tissue analog materials may, for example, employ a wide variety of hydrogel materials, including but not limited to polyvinyl alcohol, polyvinyl pyrrolidone, polyethylene oxide, and polyhydroxyethyl methacrylate. This entire class of materials is in general physically tissue-like by nature of incorporating water, but by carefully controlling such parameters as molecular structure, density, wall thickness, durometer, and many other physical characteristics a good match between the actual tissue and analog material may be achieved. Polymers that may also be useful for hydrogel materials include high molecular weight polyethylene oxide (PEO) and hyaluronate. Stabilized hyaluronate is commercially available (Fidia Advanced Biopolymers). Various PEO polymers are also commercially available.

Poly(vinyl alcohol) is normally produced by the acid-catalyzed hydrolysis of poly(vinyl acetate), which effectively converts the pendant acetate groups to hydroxyl groups. The properties of the resulting polymer are determined by tacticity, degree of hydrolysis, and molecular weight. Most commercial grades of PVA are stereoregular (primarily isotactic) with less than 2% of the repeat units forming in the 'head-to-head' (adjacent hydroxyl groups) configuration. In theory this should allow a high degree of crystallinity in the finished product. However, this is hindered by the presence of residual acetate groups so the tendency toward crystallization depends primarily on the degree of hydrolysis. This refers to the percentage of converted acetate groups on the main chain. Partially hydrolyzed grades (less than 75% conversion) do not crystallize significantly and are soluble in water at room temperature. This is because the large number of bulky acetate groups increases free volume and prevents the long-range interchain associations required for crystallization to occur. As the degree of hydrolysis increases the loss of bulky acetate groups reduces free volume and the chains are allowed to more closely approach one another. The compact but highly polar hydroxyl groups then come into close proximity and 'bind' the chains together through strong hydrogen bonding. These interchain forces increase the degree of crystallinity and greatly reduce solubility. In fact, in spite of the high concentration of hydroxyl groups completely hydrolyzed grades of PVA should be heated to nearly 100 C. to attain solution. These materials exhibit excellent mechanical properties and chemical resistance and also swell to a significant degree.

The properties of PVA hydrogels vary with molecular weight, but since these materials are normally obtained in polymer form the molecular weight cannot easily be adjusted. Instead these properties are typically modified by means of chemical or physical crosslinking. Chemical gels are easily formed by the addition of agents which undergo condensation with the hydroxyl groups on the main chain. A number of aldehydes (glutaraldehyde, formaldehyde, etc.), dicarboxylic acids (adipic acid, terephthalic acid, etc.), and metal ions ($Fe^{3+}$, $B^{5+}$, etc.) will form chemical bonds with PVA which result in crosslinks. Longer molecules such as diacids are generally preferred over metal ions because the ion 'bridge' is short and restrictive, embrittling the material. Molecules such as adipic acid can effectively restrict chain mobility while maintaining some measure of flexibility.

The orientation of a given gel material may be induced by crosslinking, drawing the material, by heat treatment, or by casting the polymer in solution with gelling agents. These agents create specific interactions between the hydroxyl groups on adjacent chains, bringing them together to improve hydrogel bonding. Many such agents are known, and this process is easily employed on a laboratory scale. This is the method the author employed for the fabrication of PVA gels used in this study. The process (Table III, see Example 1 below) is very simple and basically only involves dissolving the polymer in a solution of water and the gelling agent, dimethyl sulfoxide (DMSO). This solution will spontaneously gel over several hours at room temperature or when chilled. The properties of the resulting gel depend on the molecular weight and concentration of the polymer in solution, as well as the concentration of the gelling agent. Increasing the concentration of the agent tends to improve strength, but also reduces swelling. At any rate, the amount of gelling agent should be minimized because it must be extracted prior to use.

A cell seeded contact layer may be formed through use of a bioreactor. A bioreactor containing a growth chamber having a substrate on which the cells are attached, and means for applying relative movement between a liquid culture medium and the substrate to provide the shear flow stress can be used. See, e.g., U.S. Pat. No. 5,928,945. The bioreactor works by applying sheer flow stress to the cells housed in a growth chamber thereby allowing a continuous flow of liquid growth medium from the reservoir of the medium through the growth chamber, and back to the reservoir, in response to force applied by a pump. If desired, the bioreactor can subject the device to changes in pressure. The cell seeded layer may then be employed to build a medical testing embodiment which involves association with one or more contiguous layers with the cell seeded impact bearing layer. U.S. publication no. 2004/0044403 and U.S. Pat. Nos. 6,875,605; 6,218,182; and 6,143,293 are cited to for convention methodologies for producing cell seeded structures.

FIG. 1 shows one embodiment of the subject invention directed to a femoral artery model 100. The model 100 comprises artificial support tissue including muscle 122, skin 124, bone 126 and fat 128. Embedded into the artificial muscle 122 is a luminal structure 130 geometrically simulating a femoral artery. Portions of the luminal structure walls may be constructed of hydrogel, or preferably, as shown in FIG. 1 entire luminal structure wall is constructed of hydrogel material and composite materials incorporating hydrogel materials. The artificial support tissue may also be constructed of hydrogel material, but not necessarily. The model 100 also comprises a seam 140 running along the longitudinal axis of the model 100. The model comprises two segments 145 and 142 which are brought together and engaged to one another by an appropriate mechanism. The segments 145 and 142 may be separated to access luminal structure 130 to remove for testing and/or to replace with another luminal structure for additional testing. For example, upon the luminal structure 130 being subjected to a predetermined test or simulated procedure while in the model 100, the luminal structure 130 may be removed to study the affect of such test or procedure on the luminal structure 130. Once the luminal structure 130 is removed from the model 100, it may be replaced by another to conduct a replicate test or procedure, or different test or procedure, without having to replace the entire model. Those skilled in the art will appreciate that the engageable segments 145 and 142 may be engaged by one or more of several different mechanisms including, but not limited to, snap/friction fit, magnetic coupling, hook and loop, adhesives, tongue and groove, zipper, and/or latching mechanism. In a specific embodiment shown in FIG. 1, the two segments 145 and 142 are hinged together via a latching mechanism 150 and hinges 155 such that they are separated by pivoting from each other. This hinged and latching mechanism allows for easy and reliable opening and securing of the separate sections 145 and 142 together. Furthermore, in most cases, the testing of the luminal structure 130 will involve the employment of a liquid to be directed through the luminal structure 130. Therefore, the model 100 may be equipped with a pump 160 fluidly communicative with lines 162, 164 and reservoir 166. The artery 130 may comprise living cells lining a portion thereof and include a sleeve with channels as will be discussed below in relation to FIG. 2.

FIG. 2 shows a luminal structure model 200 comprising living cells 215 lining a luminal wall 220 of a luminal substrate 210. FIG. 3 shows a cross-sectional view of the plane 3-3. Of particular interest is a luminal substrate 210 that is comprised of a material through which nourishing molecules can pass to provide nourishment to the cells 215 lining the luminal wall 220. This is particularly helpful in growing the cells on the luminal wall 220 as well as maintaining the cells, as nourishment media can be applied to the outer surface 217 of the luminal substrate 210 which then passes through the substrate 210 and nourishes the cells 215. In other embodiments, depending on the nature of the tests being performed on the model, nourishing media can be applied directly to the cells by passing the media in fluid form through the lumen defined by the luminal substrate 210. FIG. 2 shows a cover 205 that is disposed around the luminal substrate 210. The cover 205 comprises channels 225 defined on an inner wall 227 of the cover 205. The cover may be comprised of any suitable analog material, but will typically be composed of a hydrogel or a composite material incorporating a hydrogel. The juxtaposition of the inner wall surface 227 of the cover 205 against the luminal substrate 210 creates nourishment delivery conduits formed by the channels 225 and the outer surface 217 of the luminal substrate. Those skilled in the art, in view of the teachings herein, will readily appreciate numerous other approaches to supplying nourishment media to the luminal substrate so as to provide nourishment to the cells 215. On the end of the luminal structure 200 is a seal 245 which will be discussed in the description of FIG. 4 below.

FIG. 4 shows a cross sectional view of the embodiment 200 along plane 4-4 as shown in FIG. 2. The portion of embodiment 200 shown in FIG. 4 shows the end of the luminal structure 200 that comprises a seal 245 that enables the delivery of nourishing media to the channels 225 and ultimately to cells 215 along the luminal wall surface 220. The seal 245 comprises an arcuate shape that surrounds the end of the cover 205, wherein a outer flap 272 abuts against the outer wall 270 of the cover 205 and an inner flap 274 that abuts against the inner wall 227 of the cover 205. The seal 245 comprises a chamber 275 into which nourishing media is delivered and a nozzle 277 for injection of the nourishing media into the chamber 275. Nourishing media then travels from the chamber 275 down the channels 225 for delivery of nutrients to the cells 215.

Figure 5:
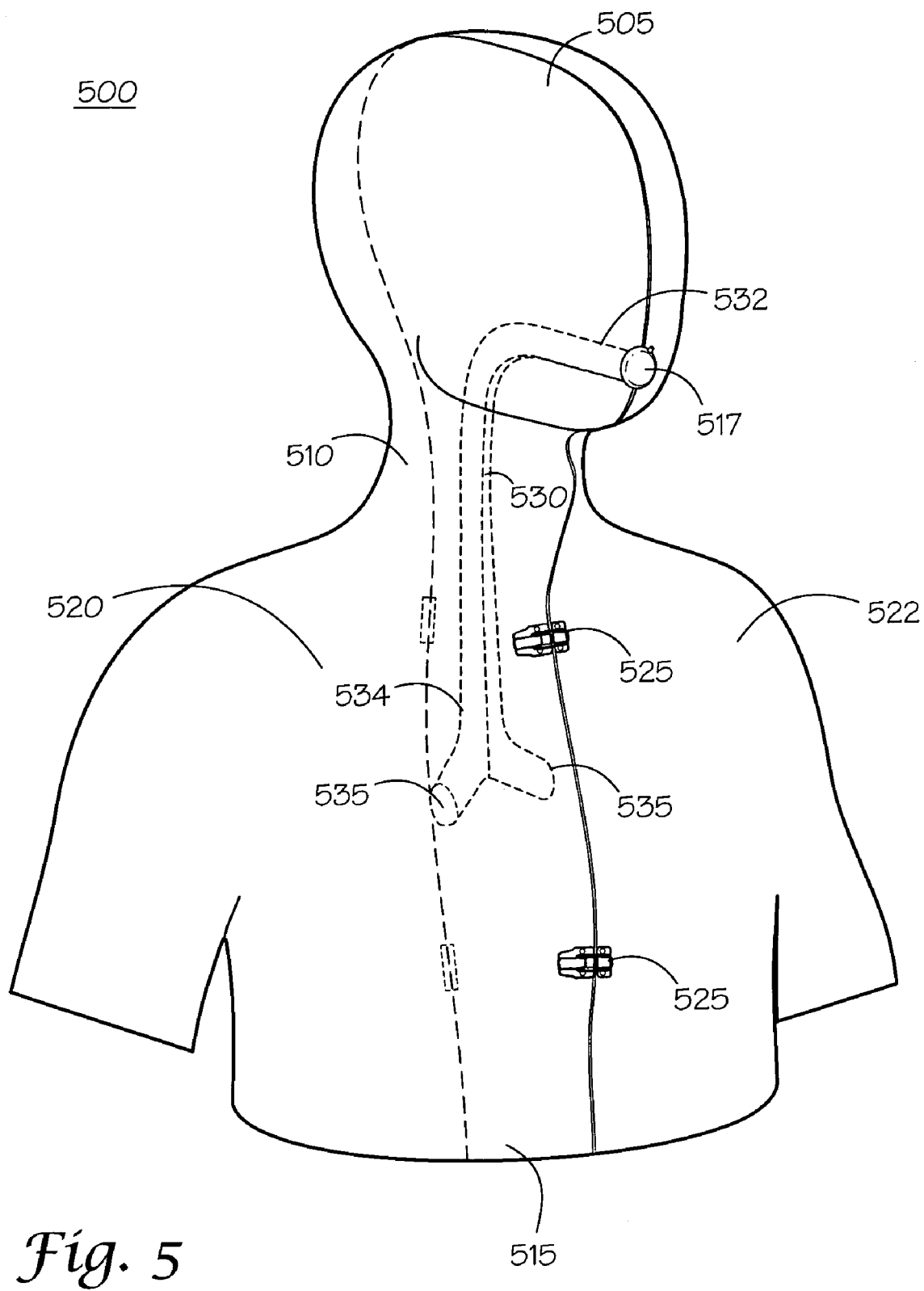
FIG. 5 shows a perspective view of a trachea embodiment.

Turning to FIG. 5, a perspective view of a trachea model 500 is shown. The model comprises a head 505, neck 510 and torso 515 that is divided into right 520 and left 522 portions. The right and left portions are fastened together with fasteners 525. The right and left portions 520, 522 may be separated to expose a luminal structure secured therein that is configured to geometrically mimic a trachea 530. The trachea structure 530 comprises a first end 532 which opens out of an orifice 517 in the head 505. On its second end 534, the trachea structure 530 divides into two branches 535 representing bronchi. Of particular interest is a trachea structure that comprises living cells (not shown) seeded on a luminal wall (not shown) thereof, similar to that discussed above for FIG. 2. Medical devices such as endotracheal tubes may be inserted into the tracheal structure 530 to study their affect on the cells seeded on luminal surface of the trachea structure 530.

Figure 6:
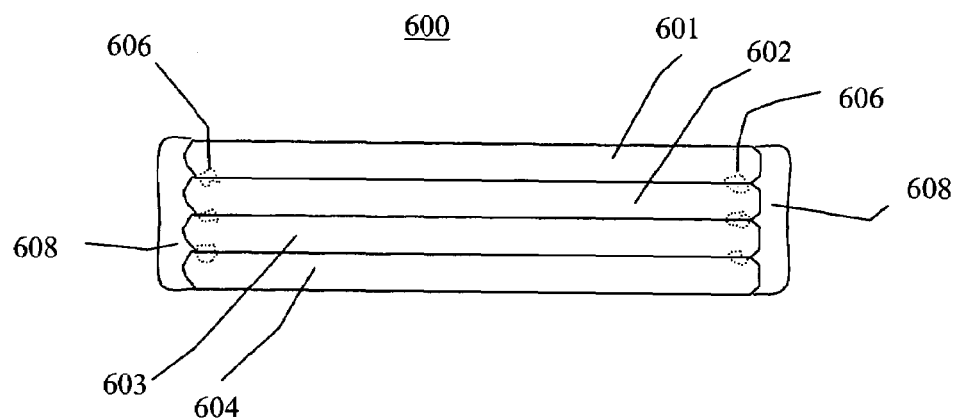
FIG. 6 shows a top (a) and bottom (b) perspective view of a femoral puck embodiment.

The Femoral Puck is a model of the human tissues that reside in the inner groin area, particularly the femoral artery and surrounding tissues near the head of the femoral bone. This portion of the anatomy is frequently accessed by medical devices that are inserted into the femoral artery in transit to the peripheral, coronary, and cranial vasculature. Referring to FIG. 8, the Femoral Puck mimics the tissues in this area between the skin surface (FIG. 8a., top side) and the femoral artery (FIG. 8b., bottom side), and allows developers to perform simple tests involving devices (such as femoral puncture closure devices) that target these tissues. FIG. 6 shows a cross section view of a specific femoral puck embodiment 600. The femoral puck comprises a plurality of discs of tissue analog materials 601, 602, 603 and 604. The different discs may have varying properties to simulate different tissue layers. The top most layer 601 is formulated to most simulate the properties of skin and attached tissues. The bottom most layer 604 is formulated to simulate various vascular tissues. The middle layers 602 and 603 are formulated to mimic muscle, fat, fascia, and other embedded tissues. The discs 601-604 are secured together via adhesive 606, suture, or other chemical or mechanical means disposed at the periphery and through implementation of a seal 608 around the edges of the discs 601-604.

Figure 7:
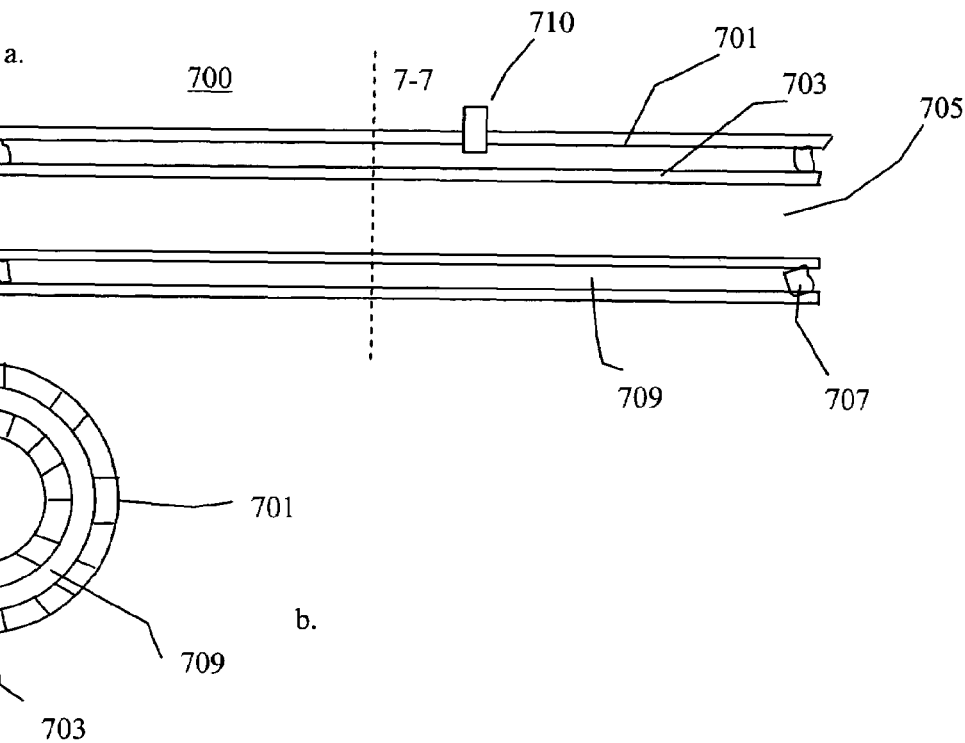
FIG. 7 shows a longitudinal cross-section (a) and a transverse cross-section (b) of another luminal embodiment that is implemented to grow cells on its luminal wall.

FIG. 7a shows a longitudinal cross-sectional view of another embodiment of a luminal structure 700 that comprises an outer layer 701 and inner layer 703 that are spaced apart to define a conduit 709 for supplying nutrients to cells (not shown) disposed in luminal wall of the lumen 705 defined by the inner layer 703. This conduit 709 is a continuous chamber surrounding the outer surface of the inner layer 703. The outer layer and inner layer are attached to each other by adhesive 707 which seals off the conduit 709. Those skilled in the art will understand that there are numerous configurations for defining the conduit and sealing the conduit. Nourishing media is injected into the conduit 709 through a port 710. Those skilled in the art will appreciate that there are numerous configurations for accessing the conduit 709 for delivery of nourishing media, including, but not limited to, injection through a syringe needle. FIG. 7b. represents a cross-sectional view along the 7-7 axis shown in FIG. 7a.

Finally, while various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims. The teachings of all patents and other references cited herein are incorporated herein by reference to the extent they are not inconsistent with the teachings herein.

What is claimed is:

1. A model designed for testing a medical device, pharmaceutical, or consumer product, said model comprising:
   an artificial anatomic structure comprising a luminal structure comprising an inner luminal wall surface and geometrically mimicking a human or animal vein or artery;
   analog material employed by said artificial anatomic structure simulating at least one predetermined physical characteristic of a target tissue, wherein said luminal structure is comprised of hydrogel and simulates tensile modulus and shear strength of a human or animal vein or artery with fifty percent or more similarity, and
   living cells disposed on said inner luminal wall.

2. The model of claim 1, further comprising an artificial support component, wherein said luminal structure is supported by said artificial support component.

3. The model of claim 1 comprising a nourishment conduit defined in said luminal structure and proximate to said inner luminal wall surface so as to provide nutrients to said living cells when nourishing media is disposed in said nourishment conduit.

4. A model designed for testing a medical device, pharmaceutical, or consumer product, said model comprising:
   an artificial anatomic structure comprising a luminal structure comprising an inner luminal wall surface and geometrically mimicking a human or animal vein or artery;
   analog material employed by said artificial anatomic structure simulating at least one predetermined physical characteristic of a target tissue, wherein said luminal structure is comprised of hydrogel and simulates tensile modulus and shear strength of a human or animal vein or artery with fifty percent or more similarity;
   living cells disposed on said inner luminal wall;
   and at least one conduit defined in said luminal structure for delivering fluid media to said living cells.

* * * * *